Patented July 13, 1937

2,086,775

UNITED STATES PATENT OFFICE 2,086,775

METHOD OF OPERATING AN INTERNAL COMBUSTION ENGINE

Willard E. Lyons and Leo J. McKone, Chicago, Ill., assignors to Leo Corporation, Chicago, Ill., a corporation of Illinois No Drawing. Application July 13, 1936, Serial No. 90,387

40 Claims. (Cl. 44—9)

This invention relates to a method of operating an internal combustion engine and more particularly to a method wherein a treated motor fuel is used to improve the efficiency of the combustion of the fuel mixture in the internal combustion engine.

In accordance with our invention, the efficiency of combustion of base fuels in an internal combustion engine is greatly increased. This increase in efficiency is accomplished by compressing and burning a charge of the base fuel in the presence of relatively minute quantities of organo-metallic compounds and their residues as formed within the combustion chamber during the operation of the engine.

The base fuels that may be used in the method of our invention include gasolines, benzene, fuel oils, kerosene, alcohols, or blends or mixtures thereof. For the purposes of our invention, the base fuel used may be either a low compression motor fuel or one that possesses some anti-knock properties, either as a result of the method of its manufacture or because of the previous addition thereto of a volatile lead compound such as tetraethyl lead. In either case the efficiency of combustion of the motor fuel is greatly improved if the fuel is compressed and burned in the presence of relatively minute quantities of the compounds which we use in the treatment of such base fuels, and in the presence of residues formed from such compounds. The improvement in combustion efficiency is manifested by an improved anti-knock performance of the engine, by increased mileage obtained from the base fuel in a given engine, by the permissible use of leaner mixtures, and by increased power output.

In carrying out our method, a base fuel such as above referred to is treated by dissolving in the fuel organic compounds of various metals which are capable under the conditions obtaining in the operation of an internal combustion engine prior to ignition of liberating the metals and/or forming metallic compounds in the air-fuel mixture which accelerate or activate chemical reactions in the combustion mixture and which, during the process of combustion, form residues that are deposited on surfaces of the combustion chamber and that are effective catalytically in increasing the efficiency of the fuel combustion. Organo-metallic compounds which are soluble in the motor fuel are preferred, but relatively insoluble compounds of metals may be dispersed in the fuel by means of mutual solvents or emulsifying agents.

The metals which provide suitable catalytic activity for the purposes of this invention are cobalt, nickel, manganese, iron, copper, uranium, molybdenum, vanadium, zirconium, beryllium, platinum, palladium, chromium, aluminum, thorium and the rare earth metals, such as cerium. The organo-metallic compounds which we prefer to use are the beta diketone derivatives and their homologues, such as the metal acetylacetonates, propionylacetonates, formylacetonates, and the like.

We have discovered a novel method of using the treated fuel in an internal combustion engine, whereby the amount of said organo-metallic compounds required to be used in each gallon of fuel is greatly decreased and a substantial reduction in the cost of the treated fuel is thereby realized.

It has heretofore been proposed, as in British Patent No. 287,192, to use metal compounds of the beta diketones in motor fuels for improving their anti-knock properties, in a manner similar to the use of tetraethyl lead. In that patent, the amounts of the metallic compounds to be used have been sufficient, upon introduction of the initial charge of the treated fuel into the motor, to produce an immediate maximum anti-knock result. Similarly, where tetraethyl lead has been used, the concentrations of tetraethyl lead in the fuel have been sufficient, immediately upon the introduction of the tetraethyl lead treated fuel into the motor, to produce anti-knock results. In the case of said British patent, from 0.1 to 1% of the metallic compounds by weight of the fuel is proposed.

We have now discovered that a catalytic residue results when the organo-metallic compounds are used in a motor fuel, whereby catalytically active material is deposited in the intake manifold, the intake ports and upon the walls and head of the combustion chamber exposed to combustion. The catalytic material includes inorganic forms, such as the metals and their oxides. Such catalytic deposits, as determined by tests and actual runs which we have made, are in themselves as active and efficient for the elimination of knock and the improvement of combustion as are the metal compounds present in suspension in the air-fuel mixture.

For example, we have dissolved in a given low compression fuel the required amount of the organo-metallic compounds which would be necessary for immediate suppression of knock in a motor of a given car and then have run the car for ten miles. Thereupon, the same fuel, but without the organo-metallic compounds, was used in the same motor and the run continued. The immediate effect was the imparting to the fuel and its combustion of the same anti-knock value possessed by the treated fuel initially used. Thereafter, upon continued running with the untreated fuel, the anti-knock value gradually diminished until no anti-knock effect could be noted. This, we believe, was due to the fact that the catalytically active deposits were carried out of the motor or otherwise depleted during the continued running of the engine.

At the end of said run, the intake manifold of the motor was removed and was replaced by a manifold in which deposits of said catalytically active material had accumulated by reason of the manifold having been used on a motor for several hundred miles during which a treated fuel had been employed. As a result of said catalytic deposits in the manifold, a substantial improvement in the anti-knock properties of the untreated fuel was noticed.

It is therefore an important object of this invention to provide a method of operating internal combustion engines that includes introducing into the air-fuel mixture taken into the intake of the engine relatively minute concentrations of organo-metallic compounds, such concentrations being insufficient in themselves to immediately impart anti-knock properties to the fuel with which said metal compounds are associated, but effective upon continued introduction of the treated fuel into the engine in building up a sufficient area of deposits of said metal compounds on the exposed surfaces of the combustion chamber, and induction passages, to result eventually in full catalytic activity, such as would be immediately present were the necessary greater amount of organo-metallic compounds initially incorporated into the fuel.

It is a further important object of this invention to provide a method of operating internal combustion engines wherein a sufficient quantity of organo-metallic compounds is incorporated into the base fuel to produce a concentration of such compounds that will result in a rapid buildup of the catalytically active deposits in the combustion chamber of the motor, and then subsequently introducing into the engine a fuel containing a substantially smaller concentration of the organo-metallic compounds, sufficient only to maintain the desired amount of catalytic deposits by renewal and replacement thereof.

Other and further important objects of this invention will become apparent from the following description and appended claims.

In accordance with our invention, from about 0.001 to 0.085% of an organo-metallic compound, or mixture of compounds, is incorporated in each gallon of base fuel. The term "base fuel" is meant to include gasoline, benzene, fuel oil, kerosene, alcohol, or blends thereof, or a fuel that has been treated with tetraethyl lead or other volatile lead compound. Tetraethyl lead does not have the property of forming upon the interior exposed walls of the combustion chamber a deposit that is catalytically active in preventing knock after the use of tetraethyl lead treated fuel has been discontinued. In other words, the deposits formed as a result of using fuels containing tetraethyl lead have no catalytic activity per se.

Metals which form compounds having desired catalytic activity in increasing the efficiency of combustion of fuels in internal combustion engines are cobalt, nickel, manganese, iron, copper, uranium, molybdenum, vanadium, zirconium, beryllium, platinum, palladium, thorium, chromium, aluminum, and the rare earth metals such as cerium. Preferably compounds of these metals are used which belong to the class of beta diketone derivatives, which have the following structural formula: $R-CO-CHR_1-COR_{11}$, wherein $R$ and $R_{11}$ are hydrocarbon radicals which may also carry halogen atoms as substituents, and $R_1$ is such a hydrocarbon radical or a hydrogen atom.

While we have found that the addition to a base fuel of a beta-diketone derivative of any one of the metals above enumerated will result in some improvement in the combustion efficiency, we prefer to employ admixtures of several metal beta-diketone derivatives. Combinations of various of the different metal compounds produce unexpectedly improved results not attainable in full measure by the use of any of the compounds singly.

Without limiting the scope of this invention, the following examples are given to illustrate preferred mixtures of organo-metallic compounds, expressed in parts by weight:

*Example 1*

| | Parts |
|---|---|
| Nickel propionylacetonate | 0.2840 |
| Cobaltous propionylacetonate | 0.2368 |
| Cerous propionylacetonate | 0.0032 |
| Thorium acetylacetonate | 0.0063 |
| Zirconium acetylacetonate | 0.0047 |
| Total | 0.5350 |

*Example 2*

| | Parts |
|---|---|
| Nickel propionylacetonate | 0.2840 |
| Cobaltous propionylacetonate | 0.2368 |
| Cerous propionylacetonate | 0.0032 |
| Thorium acetylacetonate | 0.0063 |
| Zirconium acetylacetonate | 0.0047 |
| Uranyl acetylacetonate | 0.0063 |
| Chromic acetylacetonate | 0.0063 |
| Total | 0.5476 |

*Example 3*

| | Parts |
|---|---|
| Cobaltous propionylacetonate | 0.570 |
| Nickel propionylacetonate | 0.720 |
| Copper propionylacetonate | 0.036 |
| Cerous propionylacetonate | 0.027 |
| Total | 1.353 |

As previously stated, the concentrations of organo-metallic compounds in the base fuel may be varied between 0.001 and 0.085% by weight. If more than 0.075 to 0.085% of the compound is used, the excess is largely wasted since no appreciable added efficiency of combustion is obtained over a prolonged period of operation of a motor by the use of such excess. If a relatively rapid building up of catalytically active deposits is required, as in the beginning of the use of our treated motor fuel, the higher concentrations of organo-metallic compounds should be used, say fuels containing from 0.04 to 0.075% of such compounds. The lower concentrations, namely, from 0.001 to 0.04% are not effective in improving the combustion efficiency of the fuel charge with which such compounds are introduced into the motor, but upon prolonged use become so, due to the building up of the aforementioned catalytically active deposits in the combustion chamber.

We have found from extensive runs that the use of a treated fuel containing about 0.01% of the organo-metallic compounds is ordinarily sufficient, once the requisite amount of catalytically active deposits have been built up, to perpetuate that amount of deposits by replacement of losses therefrom occasioned by factors and conditions normal to the operation of the engine.

For economic reasons, it is preferable to forego the benefit of immediate improvement in motor performance, as could be realized by the use of higher concentrations of organo-metallic compounds, and be content to obtain an ultimate benefit by the use of concentrations so small that, by themselves, they have no improving effect upon the combustion of the fuel charges with which such concentrations are immediately associated upon introduction into the motor.

It will be understood that although specific organo-metallic compounds, and mixtures thereof, have been given herein, the method of this invention contemplates the use of any organo-metallic compound capable of leaving catalytically active deposits or residues in the intake passages or in the combustion chamber that are effective in improving the combustion efficiency of the base fuel and that may be perpetuated by replacement and augmentation during continued use in the motor of a base fuel treated with such compound, or similar compounds.

The following is a description of various demonstrations made and results obtained in the actual carrying out of the method of this invention.

*Demonstrations*

1. A test car having a motor of 7.5 to 1 compression ratio was used. The base fuel employed in the demonstration was an untreated gasoline having a 65 octane number and requiring a 7 degree spark retard for absence of knock on the test hill. The formula of Example No. 2 was used in treating this base fuel, the total concentration of the organo-metallic compounds named in said example amounting to 0.055% by weight of the gasoline. No substantial improvement in the operation of the motor was immediately obtained. After ten miles of driving the car, a catalytic deposit was built up in the combustion chamber and induction passages, and the spark could be advanced two degrees without audible knock. After 20 miles of driving the spark could be advanced a total of four degrees without audible knock.

2. The same procedure as in demonstration No. 1 was followed, except that the concentration was 0.04% by weight of the fuel. No improvement in the operation of the car was immediately obtained. After fifteen miles of driving the car, the spark could be advanced two degrees without audible knock. After 40 miles the spark could be advanced 4 degrees without audible knock.

3. The same procedure as in demonstration No. 1 was followed, except that the concentration was 0.02%. No improvement in the operation of the car was immediately obtained. After 20 miles of driving the spark could be advanced one degree without audible knock. After 40 miles of driving the spark could be advanced 2 degrees, and after 80 miles of driving the spark could be advanced 4 degrees without audible knock.

4. The same procedure as in demonstration No. 1 was followed, except that the concentration was 0.01%. No improvement in the operation of the car was immediately obtained. After 50 miles of driving the spark could be advanced 1 degree, and after 100 miles, 2 degrees, without audible knock.

5. The same procedure as in demonstration No. 1 was followed, except that cobaltous propionylacetonate alone was used instead of the formula of Example No. 2. Effective deposits were built up with the same concentration of the compound in the fuel. The cobaltous propionylacetonate, used alone, formed deposits which were about 80% as effective in improving the operation of the motor, as compared with the deposits formed by formula of Example No. 2.

6. The same procedure as that in demonstration No. 5 was followed, except that nickel propionylacetonate alone was used. Deposits were formed which were about 60% as effective as compared with the deposits formed by the formula of Example No. 2.

7. The same procedure as that in demonstration No. 5 was followed, except that copper propionylacetonate was used alone. Similar results were obtained.

8. The same procedure as that in demonstration No. 5 was followed, except that amyl amine nickel chloride was used alone. Similar results were obtained.

9. The same procedure as that in demonstration No. 5 was followed, except that nickel acetylacetonate was used alone. Similar results were obtained.

10. The same procedure as that in demonstration No. 5 was followed, except that cobaltic acetylacetonate was used alone. Similar results were obtained.

11. The same procedure as that in demonstration No. 5 was followed, except that manganese naphthenate was used. It was about 50% effective as compared with the formula of Example No. 2.

12. The same procedure as that in demonstration No. 5 was followed, except that manganese propionylacetonate was used. Similar results were obtained.

13. Zirconium acetylacetonate was used alone, the concentrations being 0.02% of the fuel. The untreated fuel possessed sufficient anti-knock properties for the compression ratio of the motor, at optimum spark settings. No immediate improvement in the operation of the motor was obtained. After 20 miles of driving an effective deposit was formed in the combustion chamber and induction passages which produced a quicker acceleration time, and increased smoothness in the operation of the motor. After 50 miles of driving, the improvement in the efficiency of combustion was evidenced by a hill climb test, the time for the treated fuel and deposits being 59 seconds as against 60.2 seconds for the untreated fuel and no deposits.

14. The same procedure was followed as in demonstration No. 13, except that the compounds used were equal parts of thorium acetylacetonate and cerium propionylacetonate, the total concentration being 0.02% of the fuel. In this demonstration the saving in time for the hill climb was 2.2 seconds, for the treated fuel and deposits, or 57.8 seconds as against 60.

15. The compound used was palladium acetylacetonate. The concentration was 0.002% of the fuel. No improvement in combustion or efficiency of the motor was noticed until after 50 miles of driving. Then, increased smoothness in the operations of the motor was evident, and quicker acceleration time. After 100 miles of driving, a test for economy of fuel was started.

The treated fuel and deposits gave 10% increase in mileage as compared with the untreated fuel and no deposits. After driving 1000 miles with the treated fuel, examination for carbon accumulation was made. As evidence of improved combustion, there was found to be substantially no hard carbon formation and the total carbon deposit was greatly less than found in the motor when using an untreated fuel in the same motor with no deposits. Upon analysis of the carbon and other deposits formed in the combustion chambers after 1000 miles of driving with the treated fuel, the material was found to contain 1% palladium metal.

16. The same procedure was followed as in demonstration No. 15, except that palladium diethyl sulfide was used. Similar results were obtained.

17. The same procedure was followed as in demonstrations Nos. 1, 2, 3, 4, except that the formula of Example No. 3 was used. Improved combustion of the fuel was noted.

18. A mixture of 3 parts cerium propionylacetonate and 4 parts copper propionylacetonate were used to treat a fuel which possessed sufficient anti-knock properties for the compression ratio of the motor. The total concentration of compounds amounted to 0.04% of the fuel. No immediate improved effect upon the operation of the motor was observable. After 50 miles of driving, improvement in the operation, and in the smoothness and acceleration of the motor was noticeable, and a mileage test was started. The deposits built up in the combustion chamber and induction passages produced a mileage of 18.2 miles per gallon, as compared with a mileage of 16 miles per gallon, with the same fuel untreated, and no deposits.

19. A 62 octane base fuel was used in a motor having a 7.5–1 compression ratio. The base fuel required 8 degrees spark retard to eliminate knock on the test hill. The base fuel was then treated with formula No. 2, at a concentration of 0.04% of the fuel. No improvement in the operation of the car was immediately obtained. After catalytic deposits had been built up by 60 miles of driving, the treated fuel required only a 5.5 degree spark retard to eliminate knock on the test hill. To the treated fuel were then added 2 cc. of tetraethyl lead per gallon. In the presence of the accumulated catalytic deposits in the motor, the treated base fuel, plus 2 cc. of tetraethyl lead per gallon, required only 2.8 degrees of spark retard to eliminate knock on the test hill. The base fuel, plus 2 cc. tetraethyl lead per gallon, but otherwise untreated, and with no catalytic deposits present in the motor, required a 5 degree spark retard to eliminate knock on the test hill. The relative humidity during the tests was 41 to 45%.

20. The formula of Example No. 2 was used, the concentration in the base fuel amounting to 0.04%. After forming an effective surface area of catalytic deposits in the combustion chamber and induction passages by 55 miles of driving, the motor was operated on the test hill, 4.8 degrees of spark retard being required to secure absence of knock. The stop watch time for the hill climb was 0.674 minute. Thereupon 7.5 cc. of carbon disulfide per gallon were added to the treated fuel, and the hill test was continued. The treated fuel, with the carbon disulfide, required only 4.4 degrees of spark retard for elimination of knock, and the stop watch time for the hill climb was only 0.656 minute. The base fuel was an ordinary commercial gasoline and contained the usual amount of sulfur compounds, in addition to the 7.5 cc. of carbon disulfide per gallon here added. The relative humidity was 71 to 74%.

21. A 68 octane gasoline, as base fuel, was used in a motor having a 7.5 to 1 compression ratio. On a test hill the base fuel required a 4 degree spark retard to prevent knock. The base fuel was then treated with copper propionylacetonate to give a concentration of approximately 0.02% by weight. No immediate improvement in the efficiency of combustion occurred. After 30 miles of driving the spark could be advanced to a 2 degree retard position without knock. The 0.0004% of palladium acetylacetonate per gallon was added to the fuel already treated with the copper propionylacetonate. The promotor action of the palladium enabled an advance of the spark to 1 degree retard without knock. However, the copper-palladium combination otherwise decreased efficiency of combustion, since a substantial decrease in power and speed up the hill was recorded, and the carburetion developed flatness. To take out the flatness, it was necessary to adjust the carburetor to provide a 15% richer mixture. Then 0.012% of cobalt propionylacetonate per gallon was added to the copper-palladium treated fuel. The spark could then be advanced to a position 1 degree ahead of dead center, without knock, but the sluggishness, lack of speed, and flatness in carburetion remained. At this point 0.005% of vanadium propionylacetonate per gallon was added to the copper-palladium-cobalt treated fuel. The vanadium oxides formed in the combustion chamber restored efficiency of combustion and the air-fuel ratio could be adjusted 15% leaner, namely, back to the normal air-fuel ratio. It should be noted that 0.005% of vanadium propionylacetonate per gallon, used alone in the fuel on previous tests, showed no anti-knock value. Its function in the above test enabled the retaining of the valuable anti-knock properties of the copper-palladium-cobalt combination, and in addition restored full power and efficiency of combustion.

In all of our experiments and demonstrations, in order to get back to accurate readings on the performance of untreated fuels, it was found imperative to thoroughly clean and remove from the motor all traces of catalytic deposits previously formed.

Optimum concentrations of the catalytic metal compounds in the fuel will vary within the above stated limits, depending upon the grade and character of the fuel to be treated and upon the compression ratio of the motors in which the treated fuel is to be used.

Of the metals herein disclosed, compounds of cobalt, nickel, iron, copper and manganese are of special value for improving the anti-knock properties of the fuel. Other metals herein disclosed are of lesser value for anti-knock purposes but are of value for providing catalytically active deposits which accelerate and make more complete the combustion of the fuel. The metal derivatives of the beta-diketones may be used singly, or compounds of two or more metals may be mixed together and so constitute the total catalytic concentration in the fuel. Likewise, two or more separate compounds of the same metal may be used.

Where the base fuel already contains tetraethyl lead, or other volatile lead compound, the addition to such fuel of one or more beta-diketone derivatives such as here described further improves the efficiency of combustion of the fuel. Also, the presence of the catalytically active deposits, formed in the manner described, results in an improved combustion of fuel that contains tetraethyl lead.

In the use of gasolines treated with tetraethyl lead, it is the vapors of the tetraethyl lead formed in the combustion chamber that are effective in suppressing knock. We find that the vapors of tetraethyl lead so formed retain their knock suppressing function in the presence of the catalytic deposits which are formed in carrying out the method of this invention.

In addition to such improvement of combustion so provided by the vapors of tetraethyl lead, we find an added improvement in combustion efficiency when the fuel containing tetraethyl lead is burned in the presence of the catalytic deposits. The catalytic deposits appear to function separately, as a secondary acting agent, in further controlling and improving the efficiency of the combustion process. The improved combustion obtained by the presence of said catalytic deposits is additive to the function provided by tetraethyl lead. This invention therefore includes the use of a fuel, in accordance with the method herein described, that contains from 0.1 cc. to 5 cc. of tetraethyl lead.

Certain sulfur compounds may be present in a motor fuel without corrosive or other damaging effects on the engine. For example, the common non-corrosive sulfur compounds which remain in finished gasolines are sulfides and disulfides of aliphatic hydrocarbons and cyclic sulfur compounds. Methyl and ethyl disulfides form during the sweetening operation from the methyl and ethyl mercaptans present. It is now known that the presence of such types of sulfur compounds in the gasoline diminishes the anti-knock response of tetraethyl lead. For instance sulfur compounds in amounts of from 0.01% to 0.415% in gasoline can diminish the anti-knock response of tetraethyl lead to from 20% to 50% of its response were they not present. Consequently, in order to reduce the amount and cost of tetraethyl lead necessary to be used in gasoline to produce a required octane-number rating, gasoline refiners have heretofore considered it necessary to perform additional and costly desulfurizing operations.

On the other hand, we have proven by test, as described in demonstration No. 20, that not only does the presence of such sulfur compounds not diminish the effectiveness of the catalytic deposits formed in accordance with the method of this invention, but it promotes and increases the activity and response of such deposits in bringing about an improvement of the combustion efficiency as herein described.

This invention therefore also contemplates retaining in the fuel, or adding to the fuel, sulfur compounds of the general types such as sulfides and disulfides of aliphatic hydrocarbons and cyclic sulfur compounds, and in particular such compounds as methyl, ethyl and butyl sulfides or disulfides and carbon disulfide. The preferred concentration of any of these sulfur compounds or of a mixture of such compounds, is from 0.01% to 2% of the fuel by weight.

"Improved efficiency of combustion", as the term is used herein, is evidenced by a decreased knock; by an acceleration of the rate of total combustion; by a more uniform rate of combustion for the various hydrocarbon components of the fuel and oxidation products thereof; by a greater smoothness in the operation of the motor; by an increase in speed and power of the motor; by a decrease in fuel consumption for a given power output or mileage; by a diminished accumulation of carbon deposits, or an improvement in the character of carbon deposits, such for instance as decreased proportion of hard carbon in the deposits; and/or by the permitting of the use of a leaner mixture of fuel in the charge.

We are aware that numerous details of the process may be varied through a wide range without departing from the principles of this invention, and we, therefore, do not purpose limiting the patent granted hereon otherwise than necessitated by the prior art.

We claim as our invention:

1. The method of operating an internal combustion engine to improve the efficiency thereof which comprises introducing into a combustion chamber of said engine a fuel charge containing a relatively small concentration of an organo-metallic compound and burning said charge therein, the concentration of said organo-metallic compound being so small as to have in itself no improving effect upon the combustion of the fuel with which said compound is immediately associated but being capable of forming a catalytic deposit within said combustion chamber effective by augmentation during continued operation of said engine with a like fuel charge to increase the efficiency of combustion within said engine, the metal of said organo-metallic compound being selected from the group consisting of cobalt, nickel, manganese, iron, copper, uranium, molybdenum, vanadium, zirconium, beryllium, platinum, palladium, thorium, chromium, aluminum and cerium.

2. The method as defined by claim 1, wherein the metallic constituent of said organo-metallic compound comprises nickel.

3. The method as defined by claim 1, wherein the metallic constituent of said organo-metallic compound comprises cobalt.

4. The method as defined by claim 1, wherein the metallic constituent of said organo-metallic compound comprises manganese.

5. The method as defined by claim 1, wherein the organo-metallic compound is a beta-diketone of said metal.

6. The method as defined by claim 1, wherein the organo-metallic compound is a nickel beta-diketone.

7. The method as defined by claim 1, wherein the organo-metallic compound is a cobalt beta-diketone.

8. The method as defined by claim 1, wherein the organo-metallic compound is a manganese beta-diketone.

9. The method as defined by claim 1, wherein the organo-metallic compound is nickel propionylacetonate.

10. The method as defined by claim 1, wherein the organo-metallic compound is cobalt propionylacetonate.

11. The method as defined by claim 1, wherein the organo-metallic compound is manganese propionylacetonate.

12. The method as defined by claim 1, wherein the concentration of said compound in said motor fuel is of the order of less than 0.085% by weight of said fuel.

13. The method of enhancing the combustion efficiency of a motor fuel, which comprises stably incorporating into a gasoline motor fuel a substance in a concentration insufficient in itself to appreciably affect the combustible properties of the containing charge, a residue of said substance upon combustion of said fuel being deposited upon surfaces of the combustion chamber in a condition operatively capable ultimately of exerting a catalytic effect sufficient to improve the combustion efficiency of succeeding fuel charges in said combustion chamber, said substance being an organo-compound of a metal selected from the group consisting of cobalt, nickel, manganese, iron, copper, uranium, molybdenum, vanadium, zirconium, beryllium, platinum, palladium, thorium, chromium, aluminum and cerium.

14. The method as defined by claim 13, wherein the metallic constituent of said organo-metallic compound comprises nickel.

15. The method as defined by claim 13, wherein the metallic constituent of said organo-metallic compound comprises cobalt.

16. The method as defined by claim 13, wherein the metallic constituent of said organo-metallic compound comprises manganese.

17. The method as defined by claim 13, wherein the organo-metallic compound is a beta-diketone of said metal.

18. The method as defined by claim 13, wherein the organo-metallic compound is a nickel beta-diketone.

19. The method as defined by claim 13, wherein the organo-metallic compound is a cobalt beta-diketone.

20. The method as defined by claim 13, wherein the organo-metallic compound is a manganese beta-diketone.

21. The method as defined by claim 13, wherein the organo-metallic compound is nickel propionylacetonate.

22. The method as defined by claim 13, wherein the organo-metallic compound is cobalt propionylacetonate.

23. The method as defined by claim 13, wherein the organo-metallic compound is manganese propionylacetonate.

24. The method as defined by claim 13, wherein the concentration of said substance in said gasoline motor fuel is from 0.001 to 0.04% by weight of said fuel.

25. The method as defined by claim 13, wherein the concentration of said substance in said gasoline motor fuel is from 0.001 to 0.04% by weight of said fuel and said substance is nickel propionylacetonate.

26. The method as defined by claim 13, wherein the concentration of said substance in said gasoline motor fuel is from 0.001 to 0.04% by weight of said fuel and said substance is cobalt propionylacetonate.

27. The method as defined by claim 13, wherein the concentration of said substance in said gasoline motor fuel is from 0.001 to 0.04% by weight of said fuel and said substance is manganese propionylacetonate.

28. The method as defined by claim 13, wherein the normal anti-knock value of the gasoline motor fuel has been improved by the addition thereto of a volatile lead alkyl compound.

29. The method of utilizing a relatively low compression motor fuel to improve the combustion efficiency thereof in a motor of at least 7.5 to 1 compression ratio, which comprises forming a combustible mixture of said fuel and air, subjecting said mixture to a compression of at least 7.5 to 1 in the presence of a suspended organo-metallic compound the concentration of which in said mixture is so small as to have of itself no substantial improving effect upon the combustion of said fuel in said immediate mixture, and burning said mixture in the presence of catalytically active deposits resulting from the burning of preceding mixtures containing an organo-metallic compound, the metal of said organo-metallic compound being selected from a group consisting of cobalt, nickel, manganese, iron, copper, uranium, molybdenum, vanadium, zirconium, beryllium, platinum, palladium, thorium, chromium, aluminum and cerium.

30. The method of conditioning a combustion chamber by depositing therein a catalyst capable after a substantial amounts thereof have been deposited of enhancing the combustion efficiency of any gasoline motor fuel, which comprises burning in said chamber a gasoline motor fuel containing from 0.001 to 0.04% by weight of a beta-diketone of a metal selected from the group consisting of cobalt, nickel, manganese, iron, copper, uranium, molybdenum, vanadium, zirconium, beryllium, platinum, palladium, thorium, chromium, aluminum and cerium.

31. A motor fuel containing a metal beta-diketone compound capable upon combustion of said fuel of depositing a catalytically active residue, the amount of said compound and of said residue formed directly therefrom being so small as to have of itself substantially no improving effect upon the combustible properties of the containing charge but operatively capable of enhancing the combustion efficiency of said fuel as said residue is augmented by other similar residues formed upon combustion of other similar fuel charges, the metal of said metal beta-diketone compound being selected from the group consisting of cobalt, nickel, manganese, iron, copper, uranium, molybdenum, vanadium, zirconium, beryllium, platinum, palladium, thorium, chromium, aluminum and cerium.

32. A motor fuel as defined by claim 31, wherein the organo-metallic compound is a nickel beta-diketone.

33. A motor fuel as defined by claim 31, wherein the organo-metallic compound is a cobalt beta-diketone.

34. A motor fuel as defined by claim 31, wherein the organo-metallic compound is a manganese beta-diketone.

35. A motor fuel as defined by claim 31, wherein the organo-metallic compound is nickel propionylacetonate.

36. A motor fuel as defined by claim 31, wherein the organo-metallic compound is cobalt propionylacetonate.

37. A motor fuel as defined by claim 31, wherein the organo-metallic compound is manganese propionylacetonate.

38. A motor fuel as defined by claim 31, wherein said fuel comprises gasoline and the concentration of said organo-metallic compound contained therein is of the order of less than 0.085% by weight of said gasoline fuel.

39. A motor fuel as defined by claim 31, wherein said fuel comprises gasoline and concentration of said organo-metallic substance contained therein is from 0.001 to 0.04% by weight of said gasoline motor fuel.

40. A motor fuel as defined by claim 31, wherein the fuel comprises gasoline, the normal anti-knock value of which has been improved by the addition thereto of a volatile lead alkyl compound.

WILLARD E. LYONS.
LEO J. McKONE.